(12) United States Patent
Yin

(10) Patent No.: US 12,020,641 B2
(45) Date of Patent: Jun. 25, 2024

(54) LIGHT EMITTING DEVICE DRIVING CIRCUIT AND DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Xiang Yin, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/627,781

(22) PCT Filed: Jan. 11, 2022

(86) PCT No.: PCT/CN2022/071160
§ 371 (c)(1),
(2) Date: Jan. 17, 2022

(87) PCT Pub. No.: WO2023/115665
PCT Pub. Date: Jun. 29, 2023

(65) Prior Publication Data
US 2024/0038162 A1    Feb. 1, 2024

(30) Foreign Application Priority Data
Dec. 23, 2021   (CN) .......................... 202111589105.1

(51) Int. Cl.
*G09G 3/3233*   (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2320/045* (2013.01); *G09G 2330/021* (2013.01)

(58) Field of Classification Search
CPC ......... G09G 3/3233; G09G 2300/0819; G09G 2300/0842; G09G 2300/0861; G09G 2310/08; G09G 2320/0233; G09G 2320/045; G09G 2330/021; G09G 3/3426; G09G 2310/0262; Y02B 20/30
See application file for complete search history.

(56) References Cited

U.S. PATENT DOCUMENTS

2021/0217355 A1\* 7/2021 Zheng .................. G09G 3/3258
2021/0280132 A1\* 9/2021 Gao ...................... G09G 3/3233

FOREIGN PATENT DOCUMENTS

CN          107393479 B  * 10/2019  ........... G09G 3/3233

\* cited by examiner

*Primary Examiner* — Stephen G Sherman
(74) *Attorney, Agent, or Firm* — PV IP PC; Wei Te Chung; Zhigang Ma

(57) ABSTRACT

A light emitting device driving circuit and a display panel both include a light emitting device, a driving transistor, a data signal write module, a light emitting control module, a reset module, a compensation module, and a storage capacitor. A threshold voltage of the driving transistor can be compensated by the compensation module, and a first node can be reset by the reset module. This can solve the technical problem that the existing light emitting drive circuit cannot compensate for the threshold voltage of the driving transistor.

20 Claims, 9 Drawing Sheets

LIGHT EMITTING DEVICE DRIVING CIRCUIT AND DISPLAY PANEL

FIELD OF INVENTION

The present application relates to the field of display technologies, and more particularly to a light emitting device driving circuit and a display panel.

BACKGROUND OF INVENTION

Currently, display devices are mainly divided into passive driving and active driving. An advantage of the passive driving is low cost. However, it is difficult to achieve high resolution due to an existence of crosstalk, and a corresponding light emitting diode transient current is too large, resulting in a short service life of a power source and the display device. Active driving is equipped with a thin film transistor for each pixel, and an existence of capacitors makes it possible to avoid the problems of crosstalk and excessive transient current. Therefore, the existing display device usually adopts the active driving, thereby increasing a life span of the display device and reducing a power consumption of the display device.

When the display device adopts active driving, a light emitting diode will be in a state of working for a long time, therefore, the problem of a threshold voltage of a driving transistor shifts. In order to solve the problem of threshold voltage shift, a compensation circuit design is introduced. For example, Samsung and other companies usually use 4T1C light emitting driving circuits to achieve internal compensation of the threshold voltage. However, the light emitting drive circuits have many scan signals, complicated timings, and poor results.

Therefore, how to propose a light emitting driving circuit that can realize the internal compensation of the threshold voltage of the driving transistor is a difficult problem that existing panel manufacturers need to work hard to overcome.

Technical Problem

The purpose of the embodiments of the present application is to provide a light emitting device driving circuit and a display panel, which can solve the technical problem that the existing light emitting driving circuit cannot compensate the threshold voltage of the driving transistor, and improve a display stability of the display panel.

SUMMARY OF INVENTION

On one hand, an embodiment of the present application provides a light emitting device driving circuit, comprising: a light emitting device, wherein an anode of the light emitting device is electrically connected to a first power source, and a cathode of the light emitting device is electrically connected to a first node; a driving transistor, wherein a gate of the driving transistor is electrically connected to a second node, a source of the driving transistor is electrically connected to a third node, and a drain of the driving transistor is electrically connected to a fourth node; a data signal write module, wherein the data signal write module is configured to receive a data signal and a first scan signal, and is electrically connected to the fourth node, and the data signal write module is configured to transmit the data signal to the fourth node under a control of the first scan signal; a light emitting control module, wherein the light emitting control module is configured to receive a first control signal and is connected in series between the fourth node and a second power source, and the light emitting control module is configured to control a conduction or a disconnection between the fourth node and the second power source based on the first control signal; a reset module, wherein the reset module comprises a reset transistor, a gate of the reset transistor is connected to a second scan signal, a source of the reset transistor is electrically connected to the first power source, a drain of the reset transistor is electrically connected to the first node, and the reset module is configured to reset the first node under a control of the second scan signal; a compensation module, wherein the compensation module comprises a first compensation transistor and a second compensation transistor, a gate of the first compensation transistor is connected to the second scan signal, a source of the first compensation transistor is electrically connected to the second node, a drain of the first compensation transistor is electrically connected to the third node; a gate of the second compensation transistor is connected to the second control signal, a source of the second compensation transistor is electrically connected to the first node, a drain of the second compensation transistor is electrically connected to the third node, the compensation module is configured to reset the first node under a control of the second control signal and the second scan signal, and the compensation module is further configured to compensate a threshold voltage of the driving transistor under a control of the second control signal and the second scan signal; and a storage capacitor, wherein a first end of the storage capacitor is electrically connected to the second node, and a second end of the storage capacitor is electrically connected to the second power source.

Optionally, in some embodiments of the present application, the data signal write module comprises a data signal write transistor, a gate of the data signal write transistor is connected to the first scan signal, a source of the data signal write transistor is connected to the data signal, and a drain of the data signal write transistor is electrically connected to the fourth node.

Optionally, in some embodiments of the present application, the light emitting control module comprises a control transistor, a gate of the control transistor is connected to the first control signal, a drain of the control transistor is electrically connected to the fourth node, and a source of the control transistor is electrically connected to the second power source.

Optionally, in some embodiments of the present application, the driving transistor, the data signal write transistor, the control transistor, the reset transistor, the first compensation transistor, and the second compensation transistor are transistors of a same type.

Optionally, in some embodiments of the present application, the data signal write transistor and the second compensation transistor are different types of transistors, and the second control signal and the first scan signal are a same signal.

Optionally, in some embodiments of the present application, the reset transistor and the first compensation transistor are transistors of a same type; the control transistor and the reset transistor are transistors of different types, and the first control signal and the second scan signal are a same signal.

Optionally, in some embodiments of the present application, a voltage provided by the first power source resets the first node and the second node through the reset transistor, the first compensation transistor, and the second compensation transistor.

An embodiment of the present application further provides another light emitting device driving circuit, comprising: a light emitting device, wherein an anode of the light emitting device is electrically connected to a first power source, and a cathode of the light emitting device is electrically connected to a first node; a driving transistor, wherein a gate of the driving transistor is electrically connected to a second node, a source of the driving transistor is electrically connected to a third node, and a drain of the driving transistor is electrically connected to a fourth node; a data signal write module, wherein the data signal write module is configured to receive a data signal and a first scan signal, and is electrically connected to the fourth node, and the data signal write module is configured to transmit the data signal to the fourth node under a control of the first scan signal; a light emitting control module, wherein the light emitting control module is configured to receive a first control signal and is connected in series between the fourth node and a second power source, and the light emitting control module is configured to control a conduction or a disconnection between the fourth node and the second power source based on the first control signal; a reset module, wherein the reset module is connected to a second scan signal and is electrically connected to the first power source and the first node, and the reset module is configured to reset the first node under a control of the second scan signal; a compensation module, wherein compensation module is configured to receive a second control signal and the second scan signal, and is electrically connected to the first node, the second node, and the third node, the compensation module is configured to reset the first node under a control of the second control signal and the second scan signal, and the compensation module is further configured to compensate a threshold voltage of the driving transistor under a control of the second control signal and the second scan signal; and a storage capacitor, wherein a first end of the storage capacitor is electrically connected to the second node, and a second end of the storage capacitor is electrically connected to the second power source.

Optionally, in some embodiments of the present application, the data signal write module comprises a data signal write transistor, a gate of the data signal write transistor is connected to the first scan signal, a source of the data signal write transistor is connected to the data signal, and a drain of the data signal write transistor is electrically connected to the fourth node.

Optionally, in some embodiments of the present application, the light emitting control module comprises a control transistor, a gate of the control transistor is connected to the first control signal, a drain of the control transistor is electrically connected to the fourth node, and a source of the control transistor is electrically connected to the second power source.

Optionally, in some embodiments of the present application, the reset module comprises a reset transistor, a gate of the reset transistor is connected to the second scan signal, a source of the reset transistor is electrically connected to the first power source, and a drain of the reset transistor is electrically connected to the first node.

Optionally, in some embodiments of the present application, the compensation module comprises a first compensation transistor and a second compensation transistor, a gate of the first compensation transistor is connected to the second scan signal, a source of the first compensation transistor is electrically connected to the second node, a drain of the first compensation transistor is electrically connected to the third node; a gate of the second compensation transistor is connected to the second control signal, a source of the second compensation transistor is electrically connected to the first node, a drain of the second compensation transistor is electrically connected to the third node.

Optionally, in some embodiments of the present application, the driving transistor, the data signal write transistor, the control transistor, the reset transistor, the first compensation transistor, and the second compensation transistor are transistors of a same type.

Optionally, in some embodiments of the present application, the data signal write transistor and the second compensation transistor are different types of transistors, and the second control signal and the first scan signal are a same signal.

Optionally, in some embodiments of the present application, the reset transistor and the first compensation transistor are transistors of a same type; the control transistor and the reset transistor are transistors of different types, and the first control signal and the second scan signal are a same signal.

Optionally, in some embodiments of the present application, a voltage provided by the first power source resets the first node and the second node through the reset transistor, the first compensation transistor, and the second compensation transistor.

On another hand, an embodiment of the present application further provides a display panel comprising a plurality of pixel units arranged in an array, wherein each of the pixel units comprises a light emitting device driving circuit, and the light emitting device driving circuit comprises: a light emitting device, wherein an anode of the light emitting device is electrically connected to a first power source, and a cathode of the light emitting device is electrically connected to a first node; a driving transistor, wherein a gate of the driving transistor is electrically connected to a second node, a source of the driving transistor is electrically connected to a third node, and a drain of the driving transistor is electrically connected to a fourth node; a data signal write module, wherein the data signal write module is configured to receive a data signal and a first scan signal, and is electrically connected to the fourth node, and the data signal write module is configured to transmit the data signal to the fourth node under a control of the first scan signal; a light emitting control module, wherein the light emitting control module is configured to receive a first control signal and is connected in series between the fourth node and a second power source, and the light emitting control module is configured to control a conduction or a disconnection between the fourth node and the second power source based on the first control signal; a reset module, wherein the reset module comprises a reset transistor, a gate of the reset transistor is connected to a second scan signal, a source of the reset transistor is electrically connected to the first power source, a drain of the reset transistor is electrically connected to the first node, and the reset module is configured to reset the first node under a control of the second scan signal; a compensation module, wherein the compensation module comprises a first compensation transistor and a second compensation transistor, a gate of the first compensation transistor is connected to the second scan signal, a source of the first compensation transistor is electrically connected to the second node, a drain of the first compensation transistor is electrically connected to the third node; a gate of the second compensation transistor is connected to the second control signal, a source of the second compensation transistor is electrically connected to the first node, a drain of the second compensation transistor is electrically connected to the third node, the compensation module is configured to reset the first node under a control of the second control signal and the second scan signal, and the compensation module is further configured to compensate a threshold voltage of the driving transistor under a control of the second control signal and the second scan signal; and a storage capacitor, wherein a first end of the storage capacitor is electrically connected to the second node, and a second end of the storage capacitor is electrically connected to the second power source.

Optionally, in some embodiments of the present application, the data signal write module comprises a data signal write transistor, a gate of the data signal write transistor is connected to the first scan signal, a source of the data signal write transistor is connected to the data signal, and a drain of the data signal write transistor is electrically connected to the fourth node.

Optionally, in some embodiments of the present application, the light emitting control module comprises a control transistor, a gate of the control transistor is connected to the first control signal, a drain of the control transistor is electrically connected to the fourth node, and a source of the control transistor is electrically connected to the second power source.

Optionally, in some embodiments of the present application, the driving transistor, the data signal write transistor, the control transistor, the reset transistor, the first compensation transistor, and the second compensation transistor are transistors of a same type.

Beneficial Effect

The light emitting device driving circuit and the display panel provided by the embodiments of the present application include a light emitting device, a driving transistor, a data signal write module, a light emitting control module, a reset module, a compensation module, and a storage capacitor. The threshold voltage of the driving transistor can be compensated by the compensation module, and the first node can be reset by the reset module. Therefore, the technical problem that the existing light emitting driving circuit cannot compensate for the threshold voltage of the driving transistor can be solved, which is beneficial to improve stability of the display of the display panel.

DESCRIPTION OF DRAWINGS

In order to more clearly describe the technical solutions in the embodiments of the present application, the following will briefly introduce the drawings that need to be used in the description of the embodiments. The drawings in the following description are only some embodiments of the application. For those skilled in the art, without creative work, other drawings can be obtained based on these drawings.

DETAILED DESCRIPTION OF PREFERRED EMBODIMENTS

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

The transistors used in all the embodiments of the present application may be thin film transistors or field effect transistors or other devices with the same characteristics. Since a source and a drain of the transistor used here are symmetrical, the source and the drain are interchangeable. In the embodiments of the present application, in order to distinguish the two poles of the transistor other than a gate, one of the poles is called the source and the other is called the drain. According to the form in the figure, it is stipulated that the middle end of a switching transistor is the gate, a signal input end is the source, and an output end is the drain. In addition, the transistors used in the embodiments of the present application are N-type transistors, where the N-type transistor is turned on when the gate is at a high potential, and turned off when the gate is at a low potential. In the embodiment of the present application, a light emitting device D may be a Mini-LED or a Micro-LED.

Figure 1:
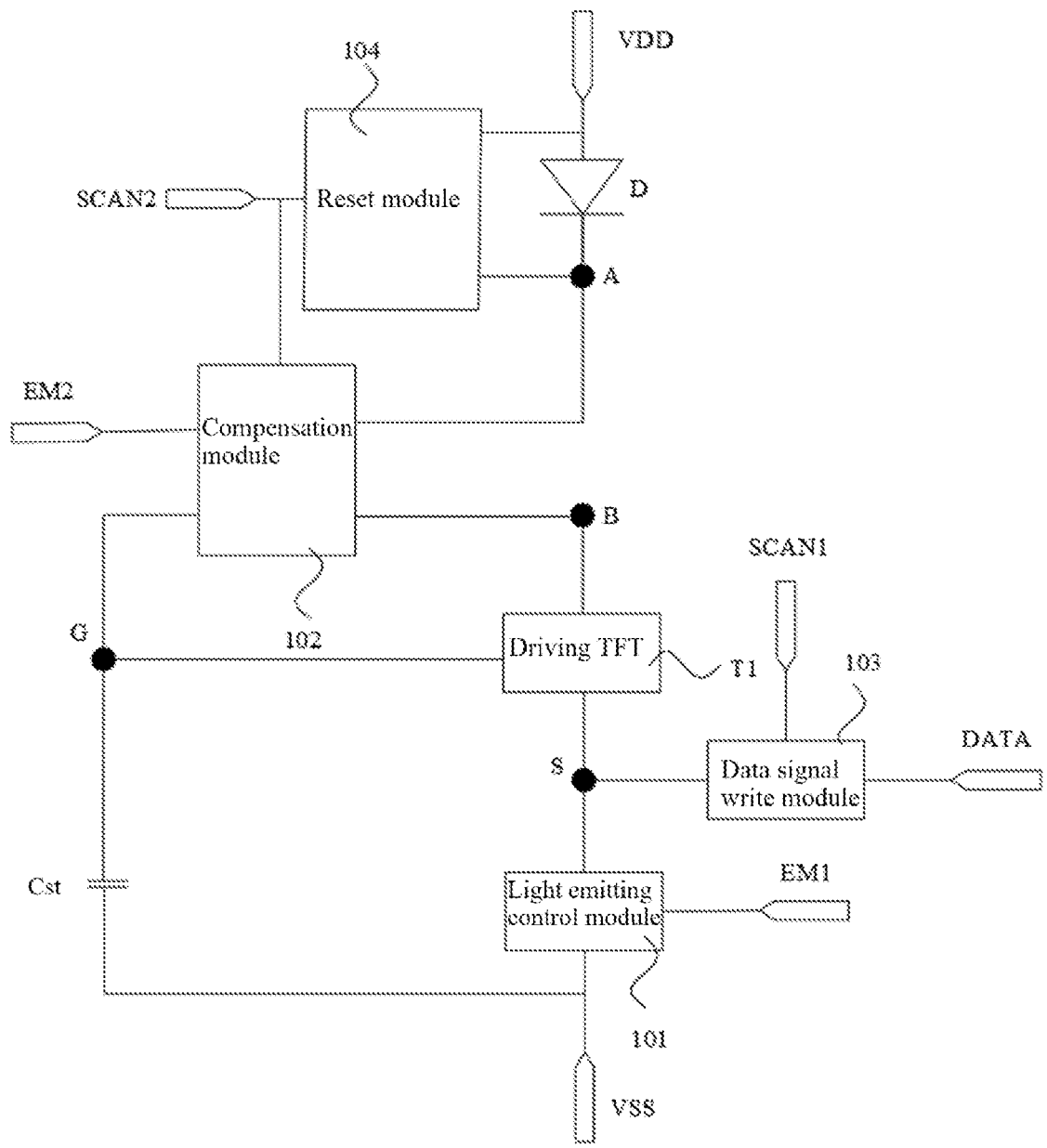
FIG. 1 is a schematic structural diagram of a light emitting device driving circuit provided by an embodiment of the application.

Please refer to FIG. 1. FIG. 1 is a schematic structural diagram of a light emitting device driving circuit provided by an embodiment of the application. As shown in FIG. 1, a light emitting device driving circuit 10 provided by the embodiment of the present application includes a light emitting device D, a driving transistor T1, a light emitting control module 101, a compensation module 102, a data signal write module 103, a reset module 104, and a storage capacitor Cst. It should be noted that the light emitting device D can be a mini light emitting diode, a mini light emitting diode, or an organic light emitting diode.

An anode of the light emitting device D is electrically connected to a first power source. A cathode of the light emitting device D is electrically connected to the first node. The light emitting control module 101 accesses a first control signal EM1. The compensation module 102 accesses a second control signal EM2 and a second scan signal SCAN2. The compensation module 102 is electrically connected to a first node A, a second node G, and a third node B. A gate of the driving transistor T1 is electrically connected to the second node G. A source of the driving transistor T1 is electrically connected to the third node B. A drain of the driving transistor T1 is electrically connected to a fourth node S. The data signal write module 103 accesses a data signal DATA and a first scan signal SCAN1, and is electrically connected to the fourth node S. The reset module 104 accesses the second scan signal SCAN2 and a first power signal VDD. The reset module 104 is electrically connected to the first node A. A first end of the storage capacitor Cst is electrically connected to the second node G, and a second end of the storage capacitor Cst is connected to a second power signal VSS.

Specifically, the driving transistor T1 is used to control a current flowing through a driving circuit. The light emitting control module 101 is configured to control the driving circuit to be turned on or off based on the first control signal EM1. The compensation module 102 is configured to reset the first node A under the control of the second control signal EM2 and the second scan signal SCAN2. The compensation module 102 is further configured to compensate a threshold voltage Vth_T1 of the driving transistor T1 under the control of the second control signal EM2 and the second scan signal SCAN2. The data signal write module 103 is used to transmit the data signal DATA to the fourth node S under the control of the first scan signal SCAN1. The reset module 104 is configured to reset the first node A under the control of the second scan signal SCAN2. The storage capacitor Cst is a gate voltage holding capacitor of the driving transistor T1.

In the light emitting device driving circuit 10 provided by the embodiment of the present application, the threshold voltage Vth_T1 of the driving transistor T1 can be internally compensated through the compensation module 102. The reset module 104 can reset the first node A. This prevents the threshold voltage Vth_T1 of the driving transistor T1 and a threshold voltage Vth LED of the light emitting device D from affecting a brightness of the light emitting device D. Furthermore, accuracy and uniformity of image display of the display panel are improved.

Figure 2:
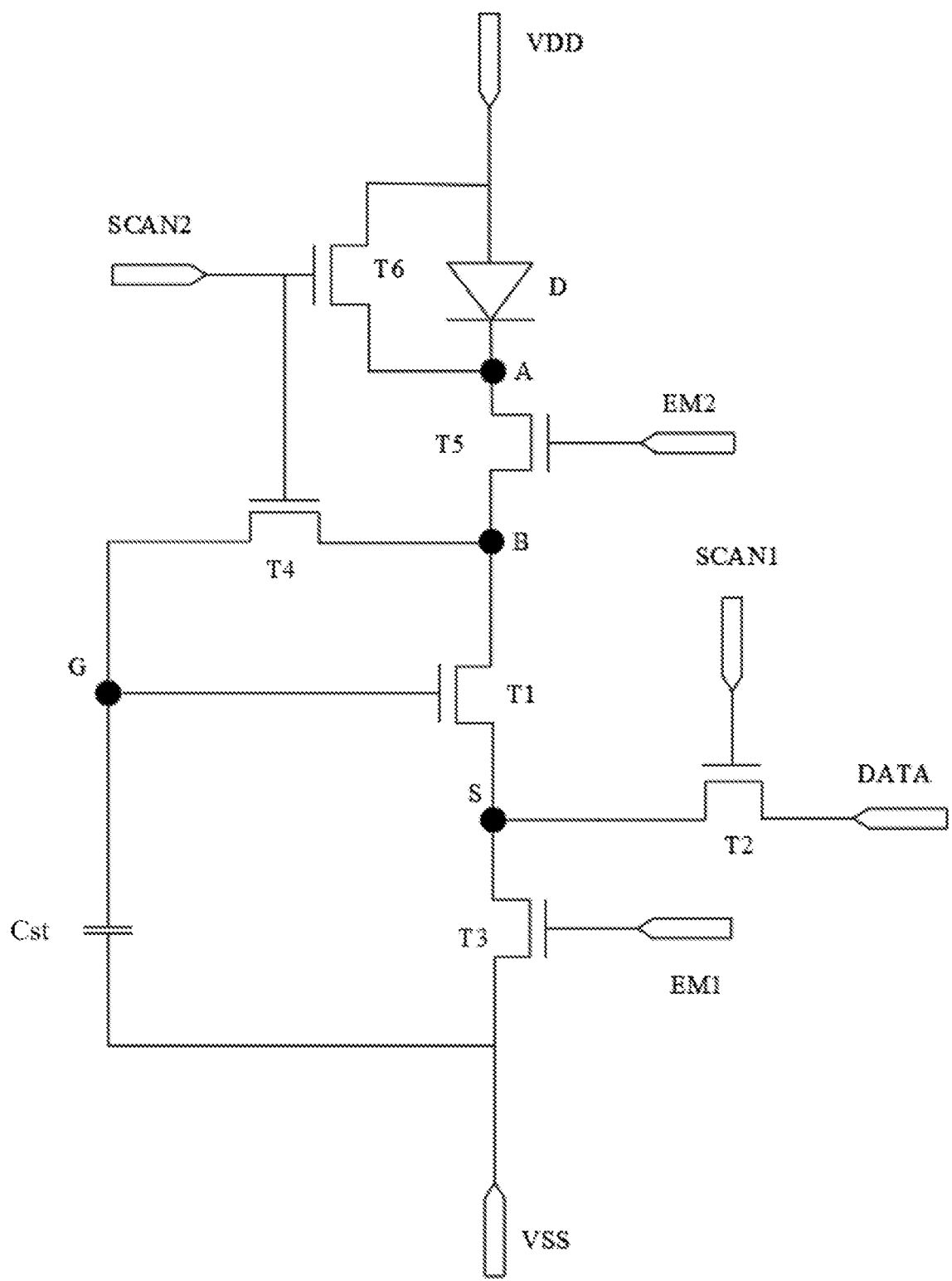
FIG. 2 is a schematic circuit diagram of a light emitting device driving circuit provided by an embodiment of the application.

Please refer to FIG. 2. FIG. 2 is a schematic circuit diagram of a light emitting device driving circuit provided by an embodiment of the application. As shown in FIG. 2, the light emitting control module 101 includes a control transistor T3. A gate of the control transistor T3 is connected to the first control signal EM1, a source of the control transistor T3 is electrically connected to the second power signal VSS, and a drain of the control transistor T3 is electrically connected to the fourth node S. The compensation module 102 includes a first compensation transistor T4 and a second compensation transistor T5. The first compensation transistor T4 is connected to the second scan signal SCAN2, a source of the first compensation transistor T4 is electrically connected to the source of the driving transistor T1, and a drain of the first compensation transistor T4 is electrically connected to the second node G. A gate of the second compensation transistor T5 is connected to the second control signal EM2, a source of the second compensation transistor T5 is electrically connected to the first node A, and a drain of the second compensation transistor T5 is electrically connected to the third node B. The data signal write module 103 includes a data signal write transistor T2. The gate of the data signal write transistor T2 is connected to the first scan signal SCAN1, a source of the data signal write transistor T2 is connected to the data signal DATA, and a drain of the data signal write transistor T2 is electrically connected to the fourth node S. The reset module 104 includes a reset transistor T6. A gate of the reset transistor T6 is connected to the second scan signal SCAN2, a source of the reset transistor T6 is connected to the first power signal VDD, and a drain of the reset transistor T6 is electrically connected to the first node A. The first end of the storage capacitor Cst is electrically connected to the second node G, and the second end of the storage capacitor Cst is connected to the second power signal VSS.

It should be noted that both the first power signal VDD and the second power signal VSS are used to output a predetermined voltage value. In addition, in the embodiment of the present application, the potential of the first power signal VDD is greater than the potential of the second power signal VSS. Specifically, the potential of the second power signal VSS may be the potential of the ground terminal. Of course, it is understandable that the potential of the second power signal VSS may also be other.

It should be noted that the driving transistor T1, the data signal write transistor T2, the control transistor T3, the first compensation transistor T4, the second compensation transistor T5, and the reset transistor T6 may be one or more of a low-temperature polysilicon thin film transistor, an oxide semiconductor thin film transistor, or an amorphous silicon thin film transistor. Further, the transistors in the light emitting device driving circuit 10 provided by the embodiment of the present application are transistors of the same type, and may all be P-type transistors or N-type transistors. This is beneficial to avoid an influence of differences between different types of transistors on the light emitting device driving circuit 10.

Figure 3:
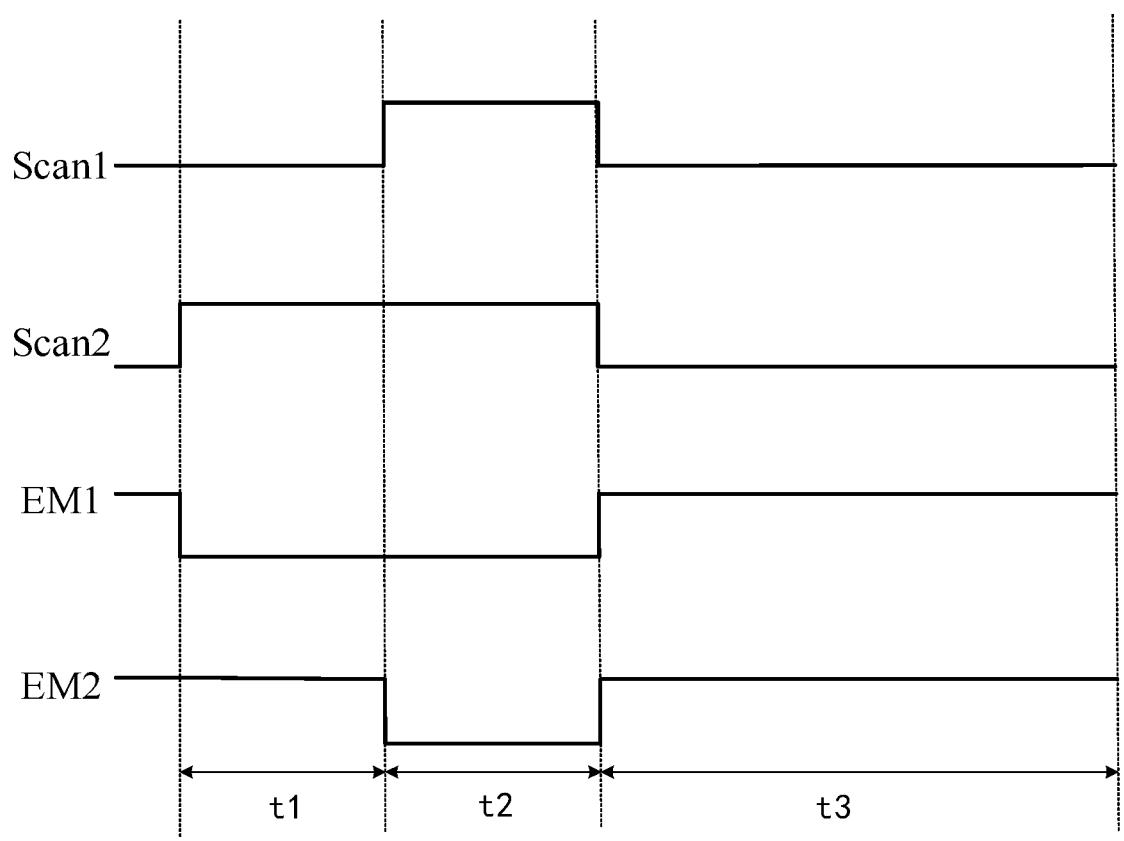
FIG. 3 is one of timing diagrams of a light emitting device driving circuit provided by the embodiment of the application.

Please refer to FIG. 3, which is one of timing diagrams of a light emitting device driving circuit provided by the embodiment of the application. The combination of the first control signal EM1, the second control signal EM2, the data signal DATA, the first scan signal SCAN1, and the second scan signal SCAN2 sequentially corresponds to a reset stage t1, a threshold voltage detection and data write stage t2, and a light emitting stage t3. That is, within one frame time, a driving control sequence of the light emitting device driving circuit 10 provided by the embodiment of the present application includes a reset phase t1, a threshold voltage detection and data write phase t2, and a light emitting phase t3.

It should be noted that the light emitting device D emits light in the light emitting stage t3.

Specifically, in the reset stage t1, the first scan signal SCAN1 is at a low potential, the second scan signal SCAN2 is at a high potential, the first control signal EM1 is at a low potential, and the second control signal EM2 is at a high potential.

Specifically, in the threshold voltage detection and data write stage t2, the first scan signal SCAN1 is at a high potential, the second scan signal SCAN2 is at a high potential, the first control signal EM1 is at a low potential, and the second control signal EM2 is at a low potential.

Specifically, in the light emitting stage t3, the first scan signal SCAN1 is at a low potential, the second scan signal SCAN2 is at a low potential, the first control signal EM1 is at a high potential, and the second control signal EM2 is at a high potential.

Specifically, the first power signal VDD and the second power signal VSS are both direct current voltage sources.

Figure 4:
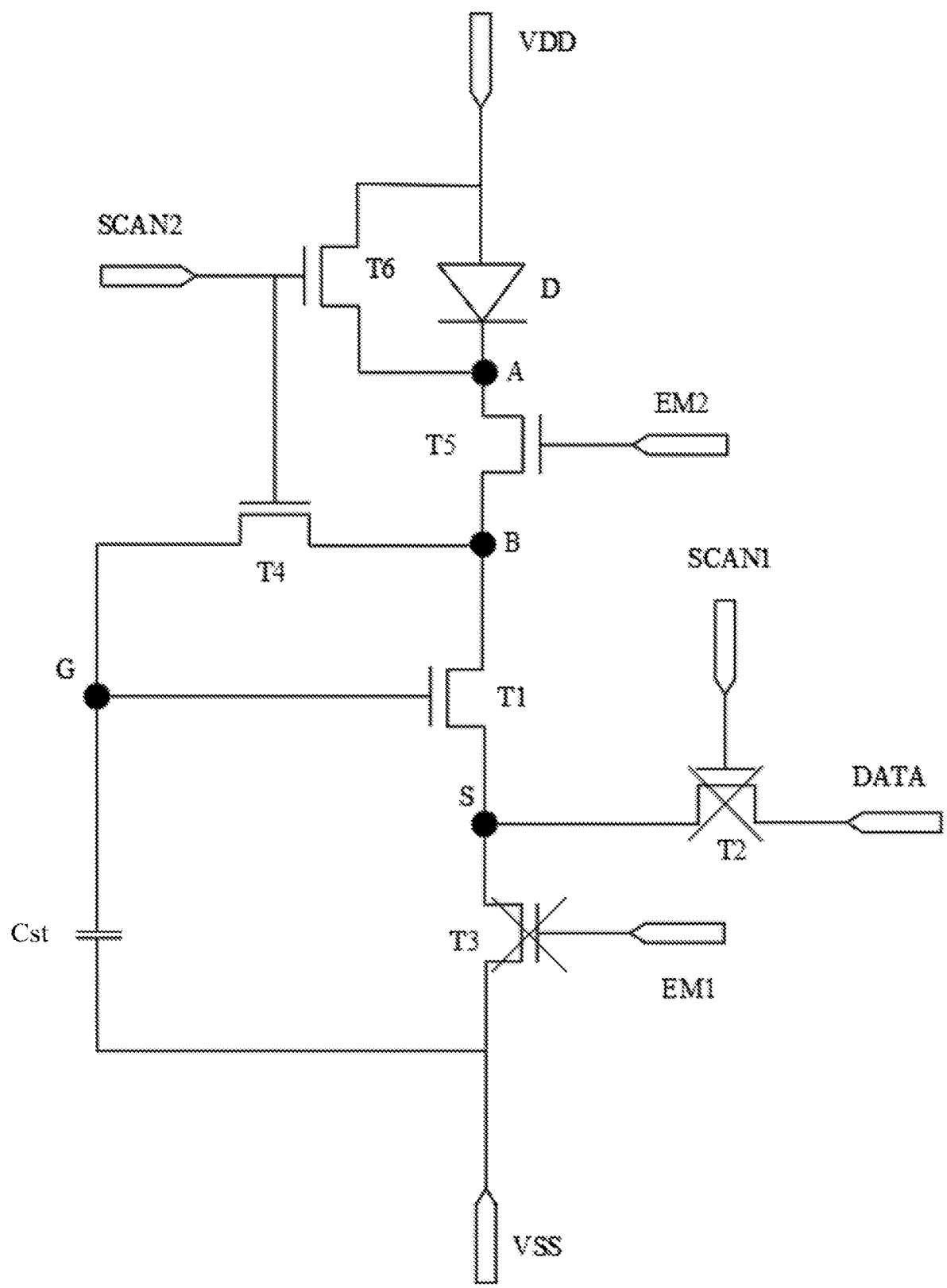
FIG. 4 is a schematic diagram of a path of a light emitting device driving circuit provided by the embodiment of the application in a reset phase under a driving sequence shown in FIG. 3.

Specifically, please refer to FIG. 3 and FIG. 4. FIG. 4 is a schematic diagram of a path of a light emitting device driving circuit provided by the embodiment of the application in a reset phase in a driving sequence shown in FIG. 3.

In the reset phase t1, the second scan signal SCAN2 is at a high potential, and the first compensation transistor T4 and the reset transistor T6 are turned on under the high potential control of the second scan signal SCAN2. The second control signal EM2 is at a high potential, and the second compensation transistor T5 is turned on under the high potential control of the second control signal EM2. In this way, the first node A and the second node G are reset, and the voltage of the first node A and the voltage of the second node G are reset to the voltage of the first power signal VDD.

In addition, when the voltage of the second node G becomes the voltage of the first power signal VDD, the driving transistor T1 is turned on under the high potential control of the second node G.

Figure 5:
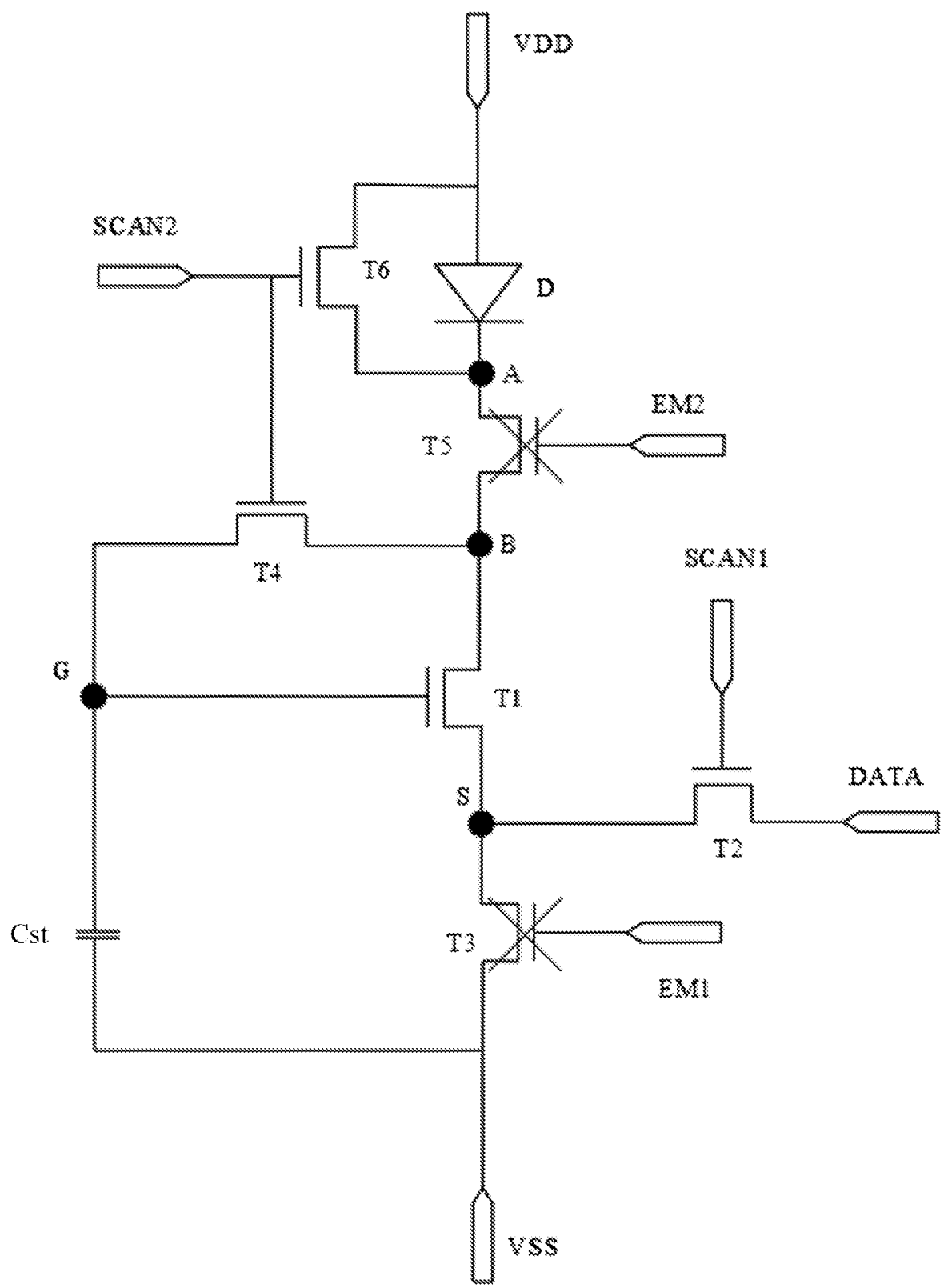
FIG. 5 is a schematic diagram of a path of a threshold voltage detection and data write stage of a light emitting device driving circuit provided by the embodiment of the application in the driving sequence shown in FIG. 3.

Specifically, please refer to FIG. 3 and FIG. 5. FIG. 5 is a schematic diagram of a path of a threshold voltage detection and data write stage of a light emitting device driving circuit provided by the embodiment of the application in the driving sequence shown in FIG. 3.

In the threshold voltage detection and data write phase t2, the first scan signal SCAN1 is at a high potential. The data signal write transistor T2 is turned on under the high potential control of the first scan signal SCAN1, and the data signal DATA is transmitted to the fourth node S so that the potential of the fourth node S becomes DATA_H. DATA_H is the voltage when the data signal DATA is at a high potential. The second scan signal SCAN2 is at a high potential, and the first compensation transistor T4 and the reset transistor T6 are turned on under the high potential control of the second scan signal SCAN2, so that the data signal write transistor T2, the first compensation transistor T4, and the reset transistor T6 form a diode structure. Thus, the potential of the second node G is Vdata+Vth_T1 from the voltage of the first power signal VDD, where Vth_T1 is the threshold voltage of the driving transistor T1.

In the threshold voltage detection and data write phase t2, because the first control signal EM1 is at a low potential, the control transistor T3 is turned off. The second control signal EM2 is at a low potential, so that the second compensation transistor T5 is turned off.

Figure 6:
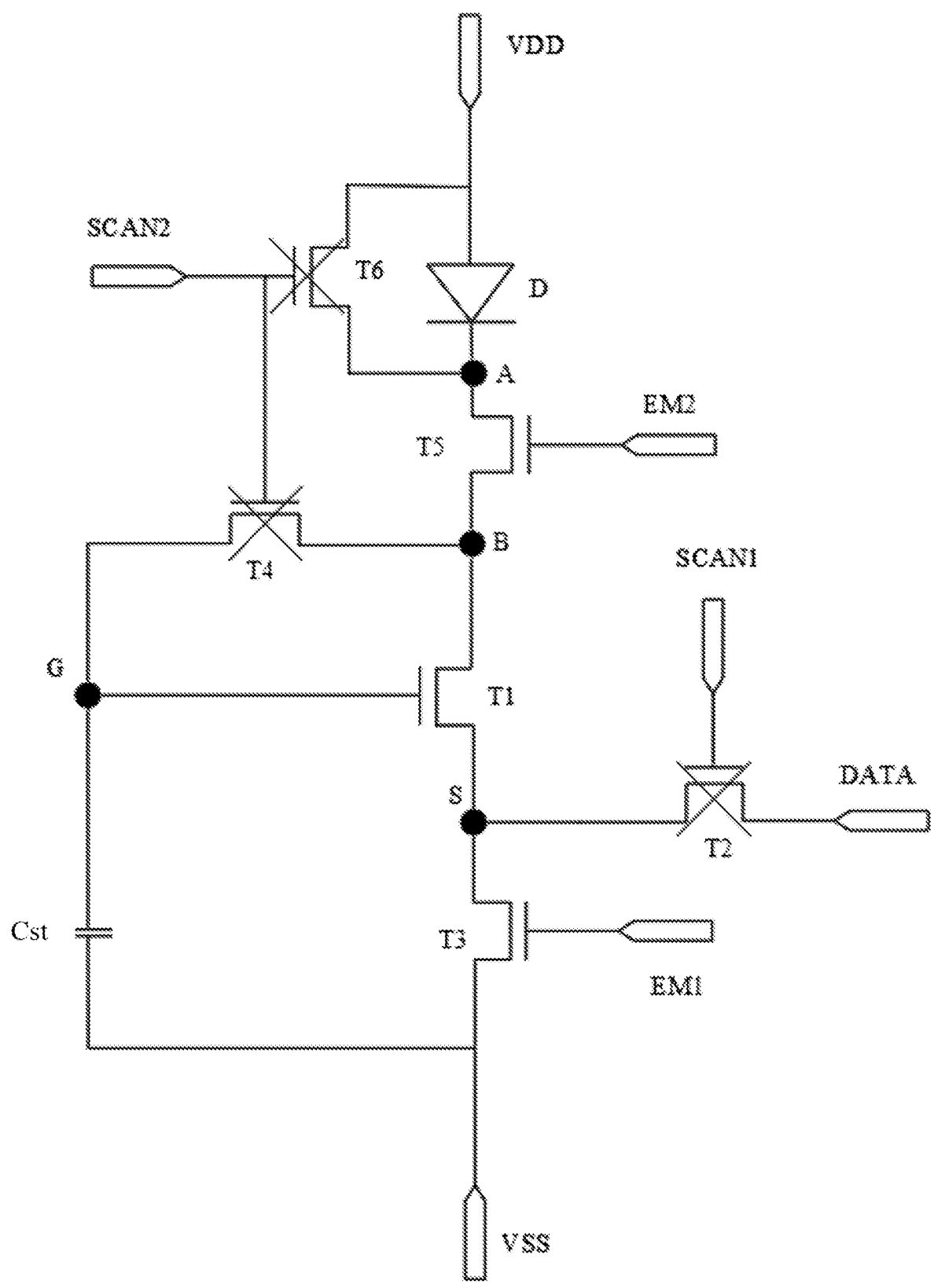
FIG. 6 is a schematic diagram of a light emitting phase of a light emitting device driving circuit provided by the embodiment of the application in the driving sequence shown in FIG. 3.

Specifically, please refer to FIG. 3 and FIG. 6. FIG. 6 is a schematic diagram of a light emitting phase of a light emitting device driving circuit provided by the embodiment of the application in the driving sequence shown in FIG. 3.

In the light emitting phase t3, the first control signal EM1 is at a high potential, and the control transistor T3 is turned on under the high potential control of the first control signal EM1. The second control signal EM2 is at a high potential, and the second compensation transistor T5 is turned on under the high potential control of the second control signal EM2. Specifically, the voltage provided by the first power signal VDD resets the first node A and the second node G through the reset transistor T6, the first compensation transistor T4, and the second compensation transistor T5.

The potential of the first node A is VDD, the potential of the second node G is maintained at Vdata+Vth_T1, and the potential of the fourth node S is VSS.

A calculation formula of a voltage difference T1_Vgs between the gate and drain of the driving transistor T1 is as follows: T1_Vgs=V_G-V_S=Vdata+Vth_T1-VSS, where VSS is the voltage of the second power signal VSS, Vth_T1 is the threshold voltage of the driving transistor T1, and Vdata is the voltage of the data signal DATA.

In the light emitting phase t3, because the first scan signal SCAN1 is at a low potential, the data signal write transistor T2 is turned off, and the second scan signal SCAN2 is at a low potential, so that the first compensation transistor T4 and the reset transistor T6 are turned off.

It can be seen from the above that the calculation formula of $I_{oled}$ flowing through the light emitting device D is as follows:

$$I_{oled}=k*(V\text{data}+V\text{th\_}T1-\text{VSS}-V\text{th\_}T1)^2=k*(V\text{data}-\text{VSS})^2.$$

k is mobility of the light emitting driving circuit. According to the calculation formula of bled flowing through the light emitting device D, the bled flowing through the light emitting device D is only related to Vdata, Vth_T1, and VSS. Therefore, the bled flowing through the light emitting device D and the threshold voltage Vth LED of the light emitting device D can prevent the threshold voltage Vth LED of the light emitting device D from affecting a brightness of the light emitting device D. Furthermore, accuracy and uniformity of the image display of the display panel are improved.

Figure 7:
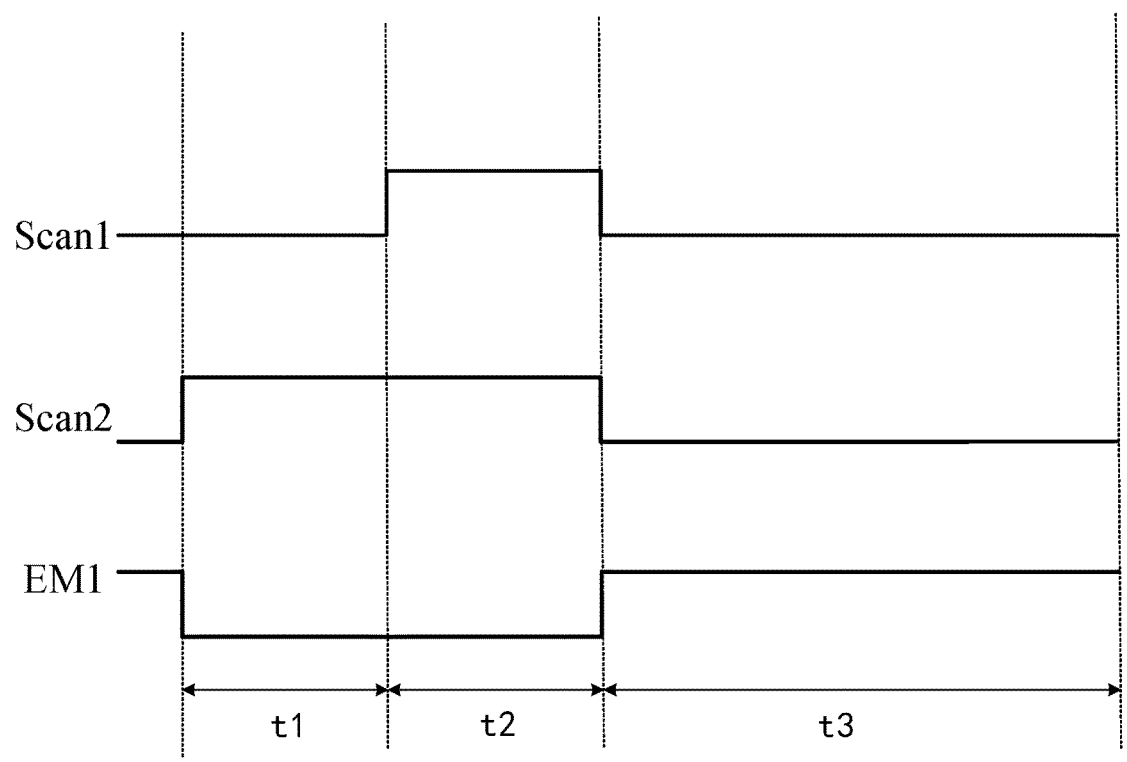
FIG. 7 is a second timing diagram of a light emitting device driving circuit provided by the embodiment of the application.

Please refer to FIG. 7. FIG. 7 is a second timing diagram of a light emitting device driving circuit provided by the embodiment of the application.

As a specific implementation of the present application, as shown in FIG. 7, the data signal write transistor T2 and the second compensation transistor T5 are different types of transistors, and the second control signal EM2 and the first scan signal SCAN1 are the same signal.

Figure 8:
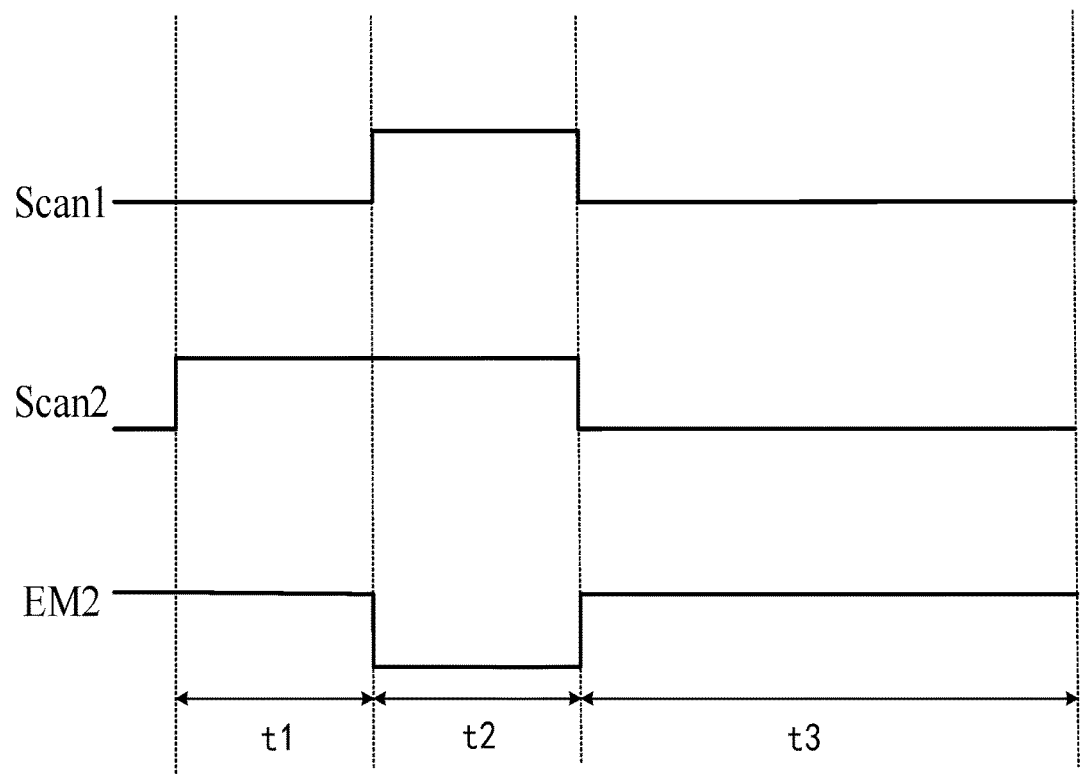
FIG. 8 is a third timing diagram of a light emitting device driving circuit provided by the embodiment of the application.

Please refer to FIG. 8. FIG. 8 is a third timing diagram of a light emitting device driving circuit provided by the embodiment of the application.

As a specific implementation of the present application, as shown in FIG. 8, the reset transistor T6 and the first compensation transistor T4 are the same type of transistors. The control transistor T3 and the reset transistor T6 are different types of transistors, and the first control signal EM1 and the second scan signal SCAN2 are the same signal.

Figure 9:
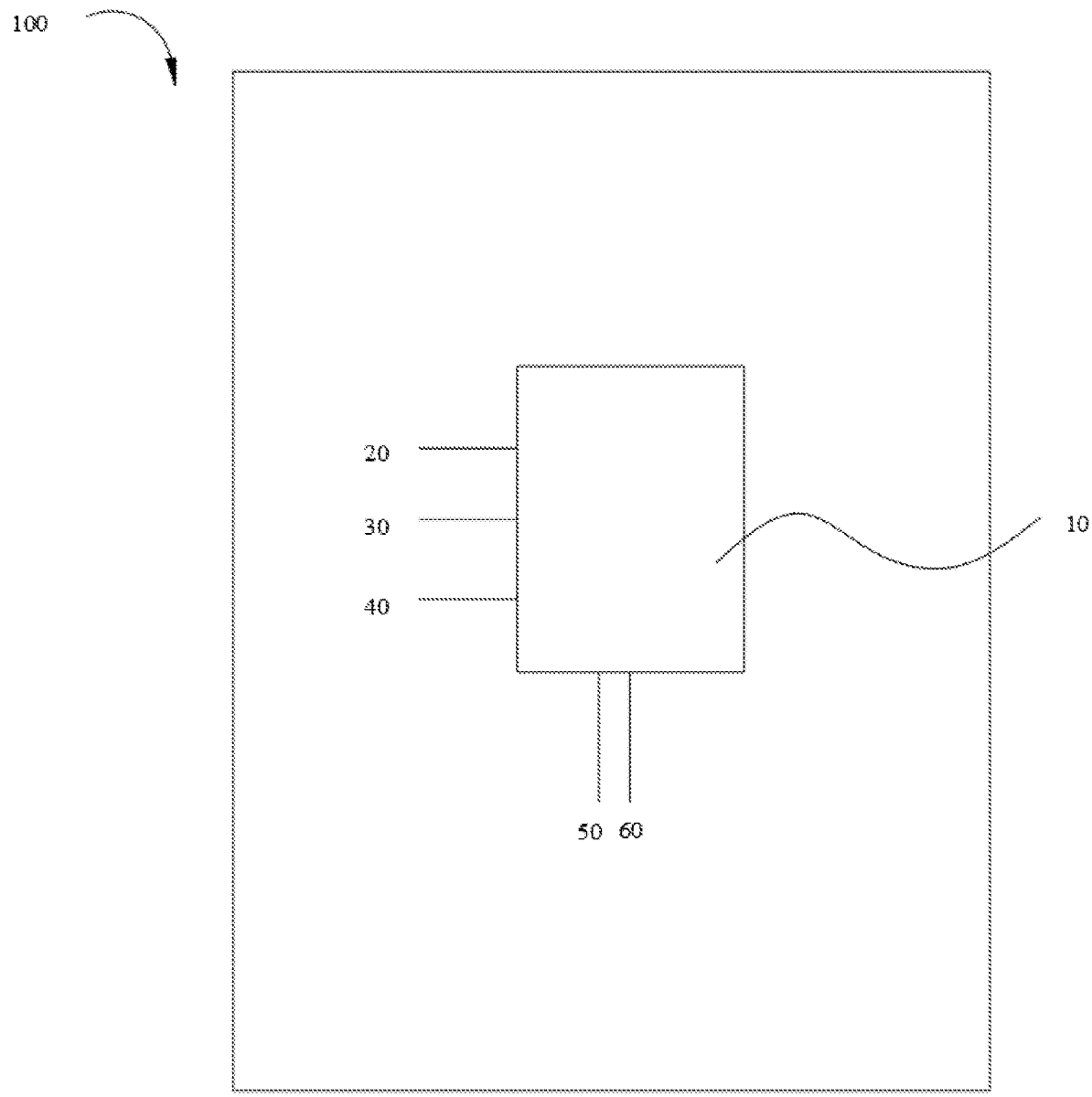
FIG. 9 is a schematic structural diagram of a backlight module provided by an embodiment of the application.

Please refer to FIG. 9, which is a schematic structural diagram of a backlight module provided by an embodiment of the application. An embodiment of the present application also provides a backlight module 100, which includes a data line 20, a first light emitting control signal line 30, a second light emitting control signal line 40, a first scan line 50, a second scan line 60, and the above light emitting device driving circuit 10. The data line 20 is used to provide data signals. The first lighting control signal line 30 is used to provide a first lighting control signal. The second light emitting control signal line 40 is used to provide a second light emitting control signal. The first scan line 50 is used to provide a first scan signal. The second scan line 60 is used to provide a second scan signal. The light emitting device driving circuit 10 is connected to the data line 20, the first light emitting control signal line 30, the second light emitting control signal line 40, the first scan line 50, and the second scan line 60. The light emitting device D may be Mini-LED or Micro-LED. For details of the light emitting device driving circuit 10, reference may be made to the above description of the light emitting device driving circuit, which will not be repeated here.

Figure 10:
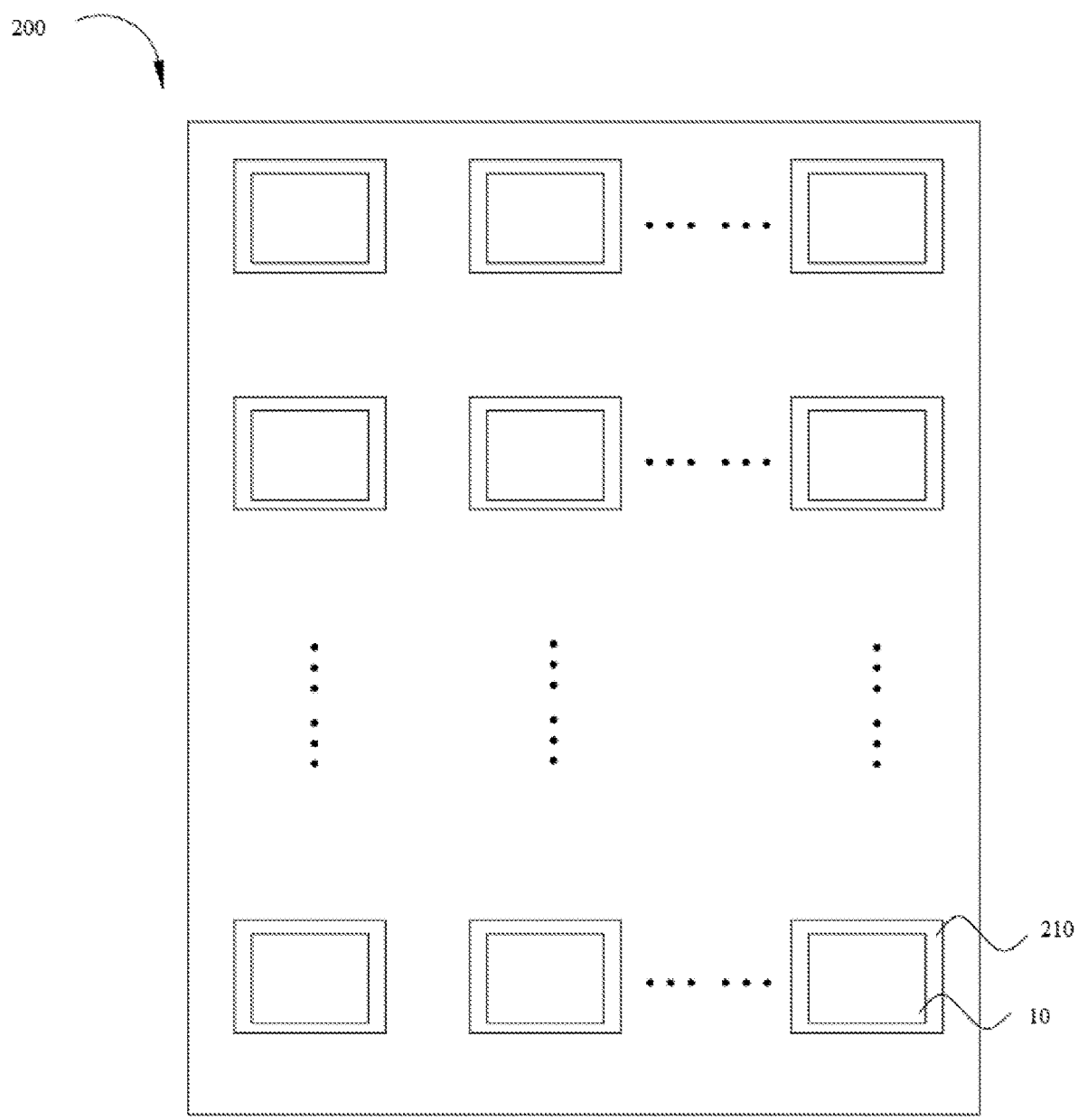
FIG. 10 is a schematic structural diagram of a display panel provided by an embodiment of the application.

Please refer to FIG. 10, which is a schematic structural diagram of a display panel provided by an embodiment of the application. An embodiment of the present application also provides a display panel 200 including a plurality of pixel units 210 arranged in an array. Each pixel unit 210 includes the light emitting device driving circuit 10 described above. The light emitting device D may be Mini-LED or Micro-LED. For details, please refer to the above description of the light emitting device driving circuit 10, which is not repeated here.

In the foregoing, the light emitting device driving circuit and the display panel provided by the embodiments of the present application have been introduced in detail. Specific examples are used in this article to illustrate the principle and implementation of this application. The description of the above embodiments is only used to help understand the method and core idea of the present application. In addition, for those skilled in the art, based on the idea of the present application, there will be changes in the specific implementation and the scope of application. In summary, the content of this specification should not be construed as a limitation to this application.

What is claimed is:

1. A light emitting device driving circuit, comprising:
a light emitting device, wherein an anode of the light emitting device is electrically connected to a first power source, and a cathode of the light emitting device is electrically connected to a first node;
a driving transistor, wherein a gate of the driving transistor is electrically connected to a second node, a source of the driving transistor is electrically connected to a third node, and a drain of the driving transistor is electrically connected to a fourth node;
a data signal write module, wherein the data signal write module is configured to receive a data signal and a first scan signal, and is electrically connected to the fourth node, and the data signal write module is configured to transmit the data signal to the fourth node under a control of the first scan signal;
a light emitting control module, wherein the light emitting control module is configured to receive a first control signal and is connected in series between the fourth node and a second power source, and the light emitting control module is configured to control a conduction or a disconnection between the fourth node and the second power source based on the first control signal;
a reset module, wherein the reset module comprises a reset transistor, a gate of the reset transistor is connected to a second scan signal, a source of the reset transistor is electrically connected to the first power source, a drain of the reset transistor is electrically connected to the first node, and the reset module is configured to reset the first node under a control of the second scan signal;
a compensation module, wherein the compensation module comprises a first compensation transistor and a second compensation transistor, a gate of the first compensation transistor is connected to the second scan signal, a source of the first compensation transistor is electrically connected to the second node, a drain of the first compensation transistor is electrically connected to the third node; a gate of the second compensation transistor is connected to the second control signal, a source of the second compensation transistor is electrically connected to the first node, a drain of the second compensation transistor is electrically connected to the third node, the compensation module is configured to reset the first node under a control of the second control signal and the second scan signal, and the compensation module is further configured to compensate a threshold voltage of the driving transistor under a control of the second control signal and the second scan signal; and
a storage capacitor, wherein a first end of the storage capacitor is electrically connected to the second node, and a second end of the storage capacitor is electrically connected to the second power source;
wherein the source of the reset transistor is only electrically connected to the first power source and the anode of the light emitting device, and is not connected to the storage capacitor;
wherein in a reset phase, the second scan signal is at a high potential, and the first compensation transistor and the reset transistor are turned on under a high potential control of the second scan signal, the second control signal is at a high potential, and the second compensation transistor is turned on under a high potential control of the second control signal, such that the first node and the second node are reset, and a voltage of the first node and a voltage of the second node are reset to a voltage of the first power source.

2. The light emitting device driving circuit according to claim 1, wherein the data signal write module comprises a data signal write transistor, a gate of the data signal write transistor is connected to the first scan signal, a source of the data signal write transistor is connected to the data signal, and a drain of the data signal write transistor is electrically connected to the fourth node.

3. The light emitting device driving circuit according to claim 2, wherein the light emitting control module comprises a control transistor, a gate of the control transistor is connected to the first control signal, a drain of the control transistor is electrically connected to the fourth node, and a source of the control transistor is electrically connected to the second power source.

4. The light emitting device driving circuit according to claim 3, wherein the driving transistor, the data signal write transistor, the control transistor, the reset transistor, the first compensation transistor, and the second compensation transistor are transistors of a same type.

5. The light emitting device driving circuit according to claim 3, wherein the reset transistor and the first compensation transistor are transistors of a same type; the control transistor and the reset transistor are transistors of different types, and the first control signal and the second scan signal are a same signal.

6. The light emitting device driving circuit according to claim 2, wherein the data signal write transistor and the second compensation transistor are different types of transistors, and the second control signal and the first scan signal are a same signal.

7. The light emitting device driving circuit according to claim 1, wherein a voltage provided by the first power source resets the first node and the second node through the reset transistor, the first compensation transistor, and the second compensation transistor.

8. A light emitting device driving circuit, comprising:
a light emitting device, wherein an anode of the light emitting device is electrically connected to a first power source, and a cathode of the light emitting device is electrically connected to a first node;
a driving transistor, wherein a gate of the driving transistor is electrically connected to a second node, a source of the driving transistor is electrically connected to a third node, and a drain of the driving transistor is electrically connected to a fourth node;
a data signal write module, wherein the data signal write module is configured to receive a data signal and a first scan signal, and is electrically connected to the fourth node, and the data signal write module is configured to transmit the data signal to the fourth node under a control of the first scan signal;
a light emitting control module, wherein the light emitting control module is configured to receive a first control signal and is connected in series between the fourth node and a second power source, and the light emitting control module is configured to control a conduction or a disconnection between the fourth node and the second power source based on the first control signal;

a reset module, wherein the reset module is connected to a second scan signal and is electrically connected to the first power source and the first node, and the reset module is configured to reset the first node under a control of the second scan signal;

a compensation module, wherein compensation module is configured to receive a second control signal and the second scan signal, and is electrically connected to the first node, the second node, and the third node, the compensation module is configured to reset the first node under a control of the second control signal and the second scan signal, and the compensation module is further configured to compensate a threshold voltage of the driving transistor under a control of the second control signal and the second scan signal; and a storage capacitor, wherein a first end of the storage capacitor is electrically connected to the second node, and a second end of the storage capacitor is electrically connected to the second power source;

wherein the source of the reset transistor is only electrically connected to the first power source and the anode of the light emitting device, and is not connected to the storage capacitor;

wherein in a reset phase, the second scan signal is at a high potential, and the first compensation transistor and the reset transistor are turned on under a high potential control of the second scan signal, the second control signal is at a high potential, and the second compensation transistor is turned on under a high potential control of the second control signal, such that the first node and the second node are reset, and a voltage of the first node and a voltage of the second node are reset to a voltage of the first power source.

9. The light emitting device driving circuit according to claim 8, wherein the data signal write module comprises a data signal write transistor, a gate of the data signal write transistor is connected to the first scan signal, a source of the data signal write transistor is connected to the data signal, and a drain of the data signal write transistor is electrically connected to the fourth node.

10. The light emitting device driving circuit according to claim 9, wherein the light emitting control module comprises a control transistor, a gate of the control transistor is connected to the first control signal, a drain of the control transistor is electrically connected to the fourth node, and a source of the control transistor is electrically connected to the second power source.

11. The light emitting device driving circuit according to claim 10, wherein the reset module comprises a reset transistor, a gate of the reset transistor is connected to the second scan signal, a source of the reset transistor is electrically connected to the first power source, and a drain of the reset transistor is electrically connected to the first node.

12. The light emitting device driving circuit according to claim 11, wherein the compensation module comprises a first compensation transistor and a second compensation transistor, a gate of the first compensation transistor is connected to the second scan signal, a source of the first compensation transistor is electrically connected to the second node, a drain of the first compensation transistor is electrically connected to the third node; a gate of the second compensation transistor is connected to the second control signal, a source of the second compensation transistor is electrically connected to the first node, a drain of the second compensation transistor is electrically connected to the third node.

13. The light emitting device driving circuit according to claim 12, wherein the driving transistor, the data signal write transistor, the control transistor, the reset transistor, the first compensation transistor, and the second compensation transistor are transistors of a same type.

14. The light emitting device driving circuit according to claim 12, wherein the data signal write transistor and the second compensation transistor are different types of transistors, and the second control signal and the first scan signal are a same signal.

15. The light emitting device driving circuit according to claim 12, wherein the reset transistor and the first compensation transistor are transistors of a same type; the control transistor and the reset transistor are transistors of different types, and the first control signal and the second scan signal are a same signal.

16. The light emitting device driving circuit according to claim 12, wherein a voltage provided by the first power source resets the first node and the second node through the reset transistor, the first compensation transistor, and the second compensation transistor.

17. A display panel comprising a plurality of pixel units arranged in an array, wherein each of the pixel units comprises a light emitting device driving circuit, and the light emitting device driving circuit comprises:

a light emitting device, wherein an anode of the light emitting device is electrically connected to a first power source, and a cathode of the light emitting device is electrically connected to a first node;

a driving transistor, wherein a gate of the driving transistor is electrically connected to a second node, a source of the driving transistor is electrically connected to a third node, and a drain of the driving transistor is electrically connected to a fourth node;

a data signal write module, wherein the data signal write module is configured to receive a data signal and a first scan signal, and is electrically connected to the fourth node, and the data signal write module is configured to transmit the data signal to the fourth node under a control of the first scan signal;

a light emitting control module, wherein the light emitting control module is configured to receive a first control signal and is connected in series between the fourth node and a second power source, and the light emitting control module is configured to control a conduction or a disconnection between the fourth node and the second power source based on the first control signal;

a reset module, wherein the reset module comprises a reset transistor, a gate of the reset transistor is connected to a second scan signal, a source of the reset transistor is electrically connected to the first power source, a drain of the reset transistor is electrically connected to the first node, and the reset module is configured to reset the first node under a control of the second scan signal;

a compensation module, wherein the compensation module comprises a first compensation transistor and a second compensation transistor, a gate of the first compensation transistor is connected to the second scan signal, a source of the first compensation transistor is electrically connected to the second node, a drain of the first compensation transistor is electrically connected to the third node; a gate of the second compensation transistor is connected to the second control signal, a source of the second compensation transistor is electrically connected to the first node, a drain of the second compensation transistor is electrically connected to the third node, the compensation module is configured to reset the first node under a control of the second control signal and the second scan signal, and the compensation module is further configured to compensate a threshold voltage of the driving transistor under a control of the second control signal and the second scan signal; and a storage capacitor, wherein a first end of the storage capacitor is electrically connected to the second node, and a second end of the storage capacitor is electrically connected to the second power source;

wherein the source of the reset transistor is only electrically connected to the first power source and the anode of the light emitting device, and is not connected to the storage capacitor;

wherein in a reset phase, the second scan signal is at a high potential, and the first compensation transistor and the reset transistor are turned on under a high potential control of the second scan signal, the second control signal is at a high potential, and the second compensation transistor is turned on under a high potential control of the second control signal, such that the first node and the second node are reset, and a voltage of the first node and a voltage of the second node are reset to a voltage of the first power source.

18. The display panel according to claim 17, wherein the data signal write module comprises a data signal write transistor, a gate of the data signal write transistor is connected to the first scan signal, a source of the data signal write transistor is connected to the data signal, and a drain of the data signal write transistor is electrically connected to the fourth node.

19. The display panel according to claim 18, wherein the light emitting control module comprises a control transistor, a gate of the control transistor is connected to the first control signal, a drain of the control transistor is electrically connected to the fourth node, and a source of the control transistor is electrically connected to the second power source.

20. The display panel according to claim 19, wherein the driving transistor, the data signal write transistor, the control transistor, the reset transistor, the first compensation transistor, and the second compensation transistor are transistors of a same type.

* * * * *